United States Patent [19]

Latsch et al.

[11] Patent Number: 4,513,708
[45] Date of Patent: Apr. 30, 1985

[54] METHOD FOR IGNITING LEAN FUEL-AIR MIXTURES AND AN APPARATUS TO PERFORM THE METHOD

[75] Inventors: Reinhard Latsch, Vahingen; Hans Schlembach, Mühlacker; Dieter Scherenberg, Stuttgart, all of Fed. Rep. of Germany

[73] Assignee: Robert Bosch GmbH, Stuttgart, Fed. Rep. of Germany

[21] Appl. No.: 563,856

[22] Filed: Dec. 21, 1983

Related U.S. Application Data

[60] Division of Ser. No. 403,902, Jul. 30, 1982, Pat. No. 4,442,807, which is a continuation of Ser. No. 141,437, Apr. 17, 1980, abandoned.

[30] Foreign Application Priority Data

Apr. 21, 1979 [DE] Fed. Rep. of Germany ....... 2916285

[51] Int. Cl.³ .............................................. F02B 19/18
[52] U.S. Cl. .................................... 123/263; 123/293; 123/254
[58] Field of Search ............... 123/254, 262, 263, 293, 123/169 P, 266, 286

[56] References Cited

U.S. PATENT DOCUMENTS 2,127,512  8/1938  Harper ............................. 123/169 P
4,119,065 10/1978 Noguchi et al. ..................... 123/262
4,218,992  8/1980 Latsch et al. ........................ 123/263
4,332,224  6/1982 Latsch et al. ........................ 123/263

Primary Examiner—Craig R. Feinberg
Attorney, Agent, or Firm—Edwin E. Greigg

[57] ABSTRACT

An apparatus for igniting lean fuel-air mixtures and wherein a preferably insertable ignition chamber is provided in the wall of an internal combustion engine, which ignition chamber communicates with the main combustion chamber of the internal combustion engine via a plurality of channels. At least one of the channels serves the purpose of delivering a portion of the fresh mixture entering from the main combustion chamber into the first ignition chamber in a direct stream into the rear portion thereof, remote from the combustion chamber, of the first ignition chamber. The other mixture portion of the fresh mixture charge of the ignition chamber is set into rotating motion in the swirl ignition chamber via channels discharging tangentially, on the combustion chamber side, into this chamber, so that a regulated turbulence is established the axial motion component of which is braked, as it advances in the swirl ignition chamber, by means of the fresh charge flowing back out of the rear first ignition chamber portion. In this manner, a substantial increase is attained in the first ignition capacity of the mixture in the ignition chamber.

19 Claims, 9 Drawing Figures

METHOD FOR IGNITING LEAN FUEL-AIR MIXTURES AND AN APPARATUS TO PERFORM THE METHOD

This is a division of application Ser. No. 403,902, filed 7/30/1982, now U.S. Pat. No. 4,442,807, which is a continuation of Ser. No. 141,437, filed 4/17/1980, now abandoned.

BACKGROUND OF THE INVENTION

The invention is based on a method as described herein. Apparatuses for performing such a method are known. However, the difficulty with them is in maintaining reliable ignition capacity in an operating mixture of fuel and air for the internal combustion engine where the mixture has been made as lean as possible. This apparatus on the one hand utilizes the fuel enrichment, attained by means of an established potential vortex formation in the fresh mixture flowing into the ignition chamber, in the outer edge areas of the vortex for the purpose of increasing the ignition capacity of the relatively lean operating mixture; in addition, it also utilizes ignition within the boundary layer of this vortex flow, with a spark which leaps from an electrode over to the ignition chamber wall, which improves the ignition capacity. Furhermore, by controlling the wall temperature such that it is at a high level, good heating of the mixture to be ignited is also sought, which likewise increases its ignition capacity. This apparatus has the disadvantage, however, that ignition of the fresh mixture in the ignition chamber takes place in the rearward end of the ignition chamber so as not to place excessive thermal stress on the electrode of the spark plug. At that location, however, an increased remnant gas component from the work cycle completed earlier must be expected, which again impairs ignition capacity. Known apparatuses which have a transverse scavenging characteristic for the purpose of removing the remnant gas from the ignition chamber do not enable the sufficiently forceful establishment of the vortex, with the known advantages which that would provide, and are cooled down to a greater extent as well. The provision which can be learned from other proposals, that is, locating the ignition electrode in areas having a fresh charge which is low in remnant gas in order to increase the ignition capacity of the mixtures has the disadvantage that the electrode is exposed to excessive heat stress, especially after ignition has taken place, which soon causes wear in the electrode.

OBJECT AND SUMMARY OF THE INVENTION

The method according to the invention described herein, and the apparatus also proposed for performing the method of the invention, have the advantage that the fresh charge introduced into the ignition chamber is introduced in two portions, one of which is set into rotating motion as a result of the embodiment of the overflow channel (or channels), and accordingly both the boundary layer fuel enrichment effect and the increased ignition capacity at that location are attained. Ignition then occurs in the boundary layer by means of the spark leaping over to the ignition chamber wall. The other portion of the charge is introduced directly into the rear portion of the ignition chamber and, flowing backward from there, inhibits the axial motion component of the first portion of the charge. Thus the dwell time of the introduced charge in the region of the ignition electrode is increased. The charge located there at the instant of ignition is fuel-enriched by the rotation initiated previously and, being located next to the warm wall, has the opportunity to warm up well as a result of the longer dwell time. The reduced flow velocity favors good establishment of the ignition spark. In particular, it is not necessary to warm the entire fresh charge introduced in order to attain the desired ignition capacity. This increases the speed of warmup at a given heat capacity of the ignition chamber walls. In addition, the ignition chamber itself can be kept small in size. The portion of the fresh charge flowing into the chamber directly further serves in an advantageous manner to cool the ignition electrode or the parts bearing the ignition electrode.

As a result of the features disclosed herein, advantageous further embodiments of and improvements to the apparatus disclosed are possible. It is especially advantageous that in parts of the walls which embody the jacket surface of the ignition chamber and which are directly adjacent to cooled parts of the internal combustion engine, one or more hollow chambers are disposed at least in the region of the ignition electrode, which areas are filled with a vaporizable medium serving the purpose of transporting heat (that is, they act as a heat pipe). As a result, soon after starting, a sufficiently high wall temperature is already attained in the ignition chamber, yet it does not become so high that undesirable, premature self-ignition occurs in the entering mixture. It is furthermore advantageous that the ignition device has an electrode which, in a manner known per se, is embedded in a heat-withdrawing insulating body which projects into the ignition chamber and surrounds the electrode up to a point located just before the ignition point. Thus the electrode is protected from the effects of excessive heat.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
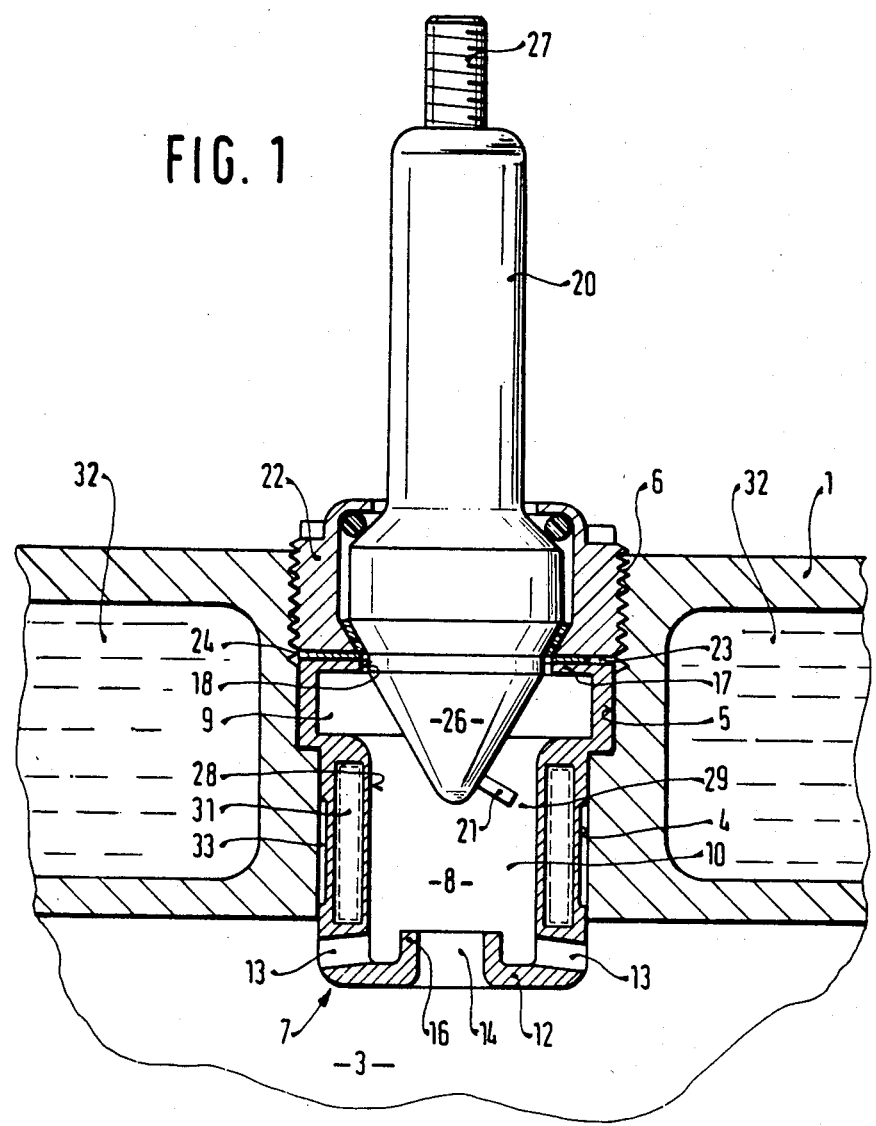
FIG. 1 shows a horizontal cross-sectional view of a first exemplary embodiment having an ignition chamber in the cylindrical walls of which heat pipes are disposed and whose end face oriented toward the combustion chamber, in addition to radially disposed overflow channels, has an axially directed overflow channel.

In FIG. 1, a portion of the combustion chamber wall 1, which defines the main combustion chamber 3 of an internal combustion engine, is shown. In this portion of the combustion chamber wall a stepped bore is provided, comprising a first bore 4 on the combustion chamber side and having a smaller diameter and a bore 5 immediately adjacent thereto having a larger diameter, and whose outermost portion has a thread 6. An insert 7 in which an ignition chamber 8 is enclosed and which is adapted to the stepped bore 4, 5, is inserted into the stepped bore. The ignition chamber 8 comprises a cylindrical, first ignition chamber portion 10 extending substantially beyond the stepped bore portion 4 and an adjacent, also cylindrical, rear ignition chamber portion 9, which is located in the region of the bore 5 of the stepped bore. The first ignition chamber portion 10 is closed off on the combustion chamber side by a first wall, that is, by the first end face 12, which protrudes freely into the main combustion chamber 3. The channels 13 extending tangentially to the first ignition chamber portion 10 are disposed in this portion of the ignition chamber, as is a first channel 14 extending coaxially with the axis of the ignition chamber. On the ignition chamber side, the first end face 12 has a stub 16 at the entry of the first channel 14. The stub 16 protrudes above the entry openings of the second overflow channels and thus acts as a guide for the mixture quantities entering via these overflow channels and favors the establishment of an ordered vortex.

On the end face 17 of the insert which is located opposite the first end face 12, an opening 18 is provided through which a rotationally symmetrical insulating body 20 protrudes inward coaxially with the axis of the ignition chamber. This insulating body 12 is part of an ignition device which substantially embodies a modified spark plug. The insulating body 20 is held in a housing 22 and is in heat-conductive contact therewith. The housing 22 is threadedly inserted into the thread 6 and with its flat pressure surface 23 holds the insert 7 in the bore. Between the pressure surface 23 and the end face 17 of the insert 7, a mica plate 24 is disposed for the purpose of heat insulation. In this manner, the insert 7 is fixed in the combustion chamber wall and the main ignition chamber 3 is simultaneously sealed off from the outside.

The portion 26 of the insulating body which projects into the ignition chamber is embodied as conical and projects approximately as far as the middle area of the first ignition chamber portion 10. An electrode is embedded in the interior of the insulating body and serves the purpose of delivering the ignition voltage. This electrode has an attachment piece 27 on the outer, extended part of the insulating body, and the electrode exits from the insulating body again at the end of part 26 of the insulating body. The ignition electrode 21 which exits at that point projects up to the vicinity of the cylindrical wall 28 of the first ignition chamber portion 10 and there embodies a spark gap 29, which is located substantially in the boundary layer of the mixture flow prevailing there.

An annular heat pipe 31 is disposed in the cylindrical wall 28 of the first ignition chamber portion 10 and serves to control the flow of heat out of the ignition chamber 8 to the adjacent, cooled chambers 32 in the combustion chamber wall 1.

Figure 2:
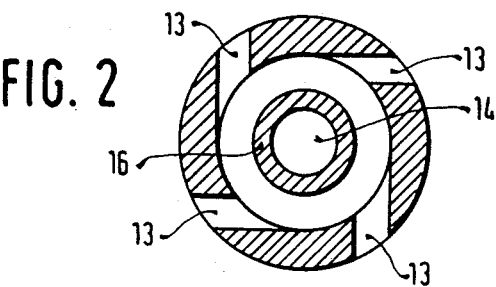
FIG. 2 is a section taken through the ignition chamber shown in FIG. 1.

FIG. 2 is a section through the lower portion of the insert, that is, the portion which protrudes into the main combustion chamber, illustrated in order to clarify the embodiment of FIG. 1. In this section, the arrangements of the second overflow channels 13 (in the illustrated embodiment, there are four of them) and the position of the first overflow channel 14 can be seen.

The charge, made up of fuel and air, which is introduced into the main combustion chamber 3 during the suction stroke of the internal combustion engine is forced during the subsequent compression stroke via the first channel 14 and the other channels 13 into the ignition chamber 8 which functions as a swirl chamber. The mixture portion flowing via the first channel 14 flows directly onto the conical part 26 of the insulation body, divides at that point, and proceeds into the rear portion 9 of the ignition chamber 8, from whence a reversal of the flow can occur. At the same time, the other portion of the mixture enters via the tangential, second channels 13. As a result of the course taken by these channels 13, the introduced mixture is set into rotating motion, so that a potential vortex moving along the cylindrical wall 28 is established and this thus surrounds the mixture flow entering via the first overflow channel 14. The stub 16 favors the establishment of an ordered vortex. As a result of the high rotary velocity of the lean mixture quantities, enrichment with fuel occurs in the region near the wall. The enriched mixture warms up at the cylindrical wall 28, which further increases its ignition capacity. The axial component of the potential vortex is damped all the more, however, the closer these mixture quantities approach the ignition electrode 21, because here the influence of the mixture quantities which have flowed in via the first channel 14 and been forced back again comes into effect. In the region of the ignition spark, only rotary motion occurs on the part of the mixture quantities which have flowed in via the second channels 13. This mixture, enriched by means of centrifugal force, remains in the region of the wall portion of the ignition chamber which is under the control of the heat pipe 31—that is, the mixture remains in the region of the cylindrical wall 28.

The built-in heat pipe offers the outstanding opportunity of preventing heat withdrawal to the cooled combustion chamber walls when the ignition chamber is still in a cold state; and when the ignition chamber has warmed up, it makes it possible to avoid overheating of the ignition chamber walls beyond the temperature at which the heat pipe begins to conduct heat. As a result of the heat pipe, an optimal maximum temperature is attained and held. Heat pipes are known per se and function according to the principle that beyond a certain temperature the fluid filling of the heat pipe changes into the vapor state, with the vapor then condensing again on the cooler parts of the heat pipe. The condensate is transported back again to the vaporization location via a heat pipe insert which has a multiplicity of capillary gaps or openings.

To increase the temperature of certain portions of the cylindrical wall 28, an insulating gap 33 can be further provided on the outer jacket of the insert 7, separating the heat pipe part of the insert from the adjacent, cooled combustion chamber wall 1. In this region of the cylindrical wall, the heat backup causes an elevation in temperature, which is, however, controllable by means of the use of the heat pipe.

The ignition electrode 21 forms the spark gap 29, approximately in the middle part of the ignition chamber, between itself and the cylindrical wall 28. The spatial volume of the ignition chamber above the cross sectional plane at the level of the spark gap 29 is approximately twice as large as the spatial volume located below this dividing plane. The electrode protrudes freely into the ignition chamber for only a short distance. Over its remaining length, it is surrounded by the heat-conducting insulating body 20 or the conical part 26 thereof. As a result of the conical embodiment, good heat transport is assured from the ignition electrode 21 to the housing 22 and from there to the cooled combustion chamber walls 1. In this manner, the thermal stressing of the ignition electrode 21 can be kept very low. The insulating body simultaneously serves the purpose of uniform distribution of the mixture quantity flowing in via the first channel 14, which is thereupon warmed at the insulating body on the one hand and simultaneously cools this insulating body during the inflow phase on the other hand.

The dimensioning of the cross section of the second channels 13 and of the first channel 14 permits the attainment of a desired volumetric distribution or a desired ratio of mixture introduced directly to the mixture set into rotating motion. Only the mixture set into rotating motion serves the purpose of the first ignition. In addition, only for this relatively small portion is it necessary that the mixture arrive in a maximally warmed up state at the location where the ignition spark leaps over to the wall. The remaining portion of the charge introduced into the ignition chamber serves to impart to the mixture as a whole the necessary energy content for ignition in the main combustion chamber.

Ignition is also favored in that the ignition spark leap occurs within the boundary layer, in which the gas velocity is reduced to zero and thus has a lower average velocity than does the mixture in adjacent portions of the volume. There is thus no danger that the ignition spark will break away, because of high-velocity mixture motion, before ignition of the mixture has taken place.

A particular advantage is that the ignition chamber or the insert can be embodied as very small, especially the diameter of the first ignition chamber portion 10, because as a result of the enlargement in diameter of the rear portion 9 of the ignition chamber the necessary volume is encompassed. As a result of the relatively small diameter of the first ignition chamber portion 10, the ignition chamber insert can be more easily housed in the combustion chamber wall forming the cylinder top. The available space at this location is quite restricted in modern internal combustion engines, because the inlet and outlet valves themselves take up the majority of the surface area. The disposition of the second channels is appropriately adapted to how the insert is installed, so that the flares exiting, after ignition of the mixture, into the ignition chamber optimally engage the charge contents of the main combustion chamber. The described ignition chamber insert is easily interchangeable and, because of the additional insulations, lends the insulating gap 33 and the mica plate 24 the opportunity, even at low load, of sufficiently prewarming the entering mixture.

Figure 9:
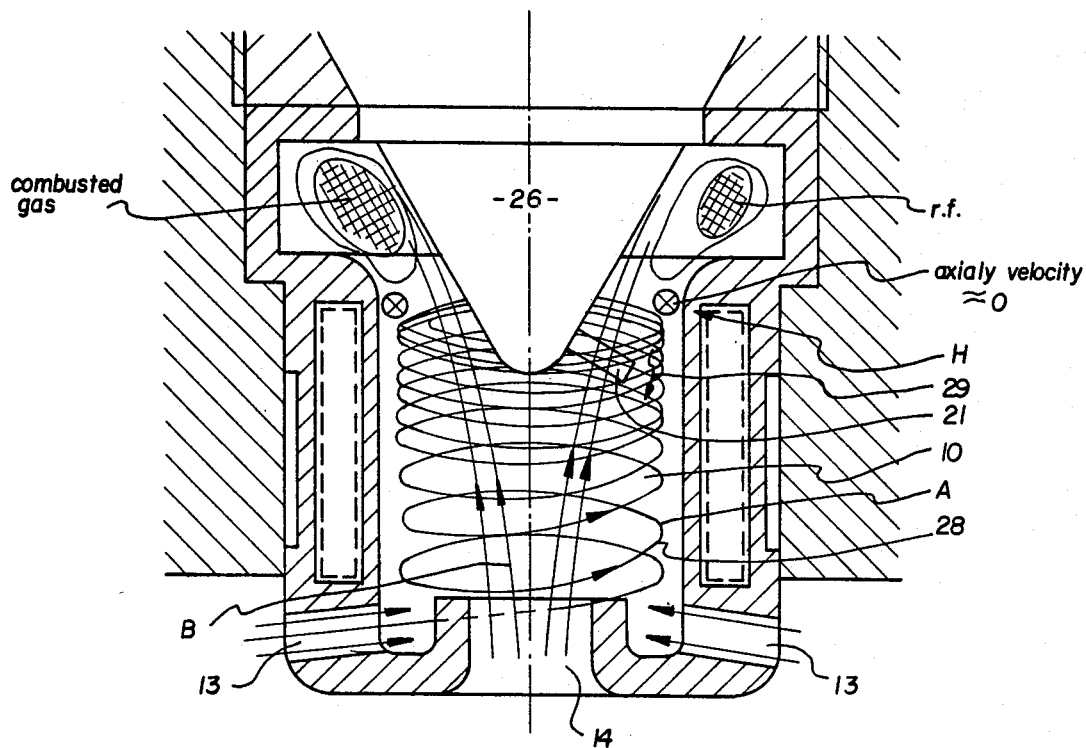
FIG. 9 is the same as FIG. 1 illustrating the flow path of the fuel-air mixture in the chamber for a fuel-air mixture flow at a crankshaft angle of about 20 degrees below its top dead center.

In FIG. 9, which is identical to FIG. 1, there has been added those flows which are formed by the selected shape of the chamber and the layout of the overflow channels if a fuel-air mixture, for example, flows into the ignition chamber at a crankshaft angle of 20 degrees below its top dead center. The tangential layout of channel 13 results in flow A which runs about the circumference wall 28, and circulates as well as rises. Axial channel 14 produces flow B which flows directly through the longitudinal shaft of the symmetrical rotation chamber toward isolator 26, where it is redirected, first radially and then in the direction of channels 13 and 14, by the portion of the ignition chamber which is farthest removed from the main combustion chamber. As may be seen in FIG. 9, the reverse flow oscillated by flow B limits the rise of flow A. Both flows A and B form H which serves as a zone of dammed-up pressure in whose limits a boundary layer is developing. Relative to the longitudinal shaft of the ignition chamber, this boundary layer shows only little velocity, or none at all.

For example, electrode 21 is located slightly below the boundary layer, and between electrode 21 and wall 28 ignition zone 29 is located. Consequently, the distance from tangential channel 13 to ignition zone 29 is much greater than from the boundary layer at H. The rising speed of the mixture within the area of ignition zone 29 is therefore much lower than in the area of tangential channels 13. In addition, since flow A rises in a spiral mode while at the same time being exposed to a frictional resistance alongside wall 28, the proportionate amount of the mixture which at the instant of ignition flows through ignition zone 29 shows an extensively lower velocity than the mixture that still flows within the tangential channels. Furthermore, due to the distance of the oncoming flow from channels 13 to ignition zone 29, based on the rules of the boundary layer theory, a comparably thick boundary layer with low flow speed and low turbulence has developed, which favorably influences combustion of the mixture. Also, due to the distance of the oncoming flow in connection with the number of channels 13 being discharged in various directions from the main combustion chamber, a division and equialization of the proportionate mixtures takes place at the ignition point, thus avoiding undesirable variations in the mixture at the instant of ignition. The comparably long dwelling period of the new load in the rising and rotating flow A in the perimeter of the ignition chamber favors the concentration of the layer flowing alongside the wall with fuel and consequently improves readiness for ignition. Since the ignited but initially small flame remains within the stablized flow, its initial growth pattern is slow but stable; subsequently it intensifies in heat and grows within flow A in a direction of increased turbulence. The high temperature eliminates the possibility of extinction. The increased turbulence results in an accelerated flame enlargement. Since flames are lighter than the not yet inflammed mixture surrounding them, the flames within the rotating flow A advance toward the longitudinal shaft of the ignition chamber and ignite the central composition mixture B. Prior to that, flow B has affected the gases which remained in the chamber from a prior combustion, and removed same from the lower portion of the ignition chamber and flushed them to the upper portion where they are being consolidated to a flammable mixture in a "combusted gas" zone. Without central flow B, residual gases within the defined chamber would remain in the lower and middle portions and be continuously siphoned into flow A close to wall 28, and thus impair ignition of the mixture within ignition zone 29. In other words, the lower portion of the chamber up to ignition zone 29 will only contain such mixtures which are directly derived from the engine and are therefore highly combustible. Due to the flame propagation direction, extending almost diagonal to the longitudinal shaft and to other specifics described above, prior to reaching the top dead center, a very rapid flame development and flame propagation within the middle portion of the ignition chamber occurs. This flame propagation with its flame fronts restricts central flow B. Due to combustion of the mixture, a rapid pressure or throttle increase takes place within the chamber, and thus the development of ignition flares occurs within channels 13 and 14, which proceed at high speeds to the main combustion chamber of the engine.

Figure 3:
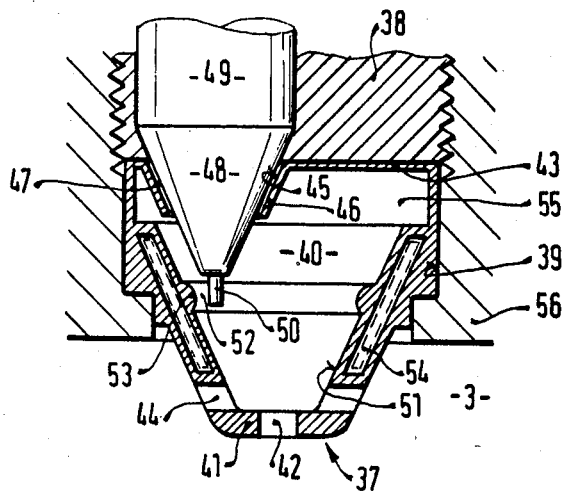
FIG. 3 also shows in a horizontal cross-sectional view, a second exemplary embodiment of the ignition chamber, which is embodied as somewhat frustoconical in shape and into which a conical insulating body which guides the ignition electrode protrudes eccentrically.

FIG. 3 shows a derivation of the exemplary embodiment of FIG. 1. Here, as well, an ignition chamber insert 37 is provided, which is held within a stepped bore 39 by the housing 38 of an ignition device. The ignition chamber insert 37, in a deviation from the previous embodiment, encloses a frustoconcial ignition chamber 40. In the same manner, the outer shape of the ignition chamber 37 is also frustoconical, with the narrower portion protruding into the main combustion chamber 3. There, a central, first channel 42 is provided on the first end face 41, the channel 42 being directed toward the opposite end face 43, which forms the base of the frustoconical body. Perpendicularly to the axis of the frustoconical body, two channels 44 are provided laterally, which discharge tangentially into the ignition chamber 40 and set the mixture entering through them into a rotating motion. As in the first exemplary embodiment, the mixture entering through the two channels 44 encircles the mixture stream entering via the first overflow channel 42.

An opening 45 is provided eccentrically on the end face 43, which is surrounded by a conical sleeve 46 which narrows down into the interior of the ignition chamber 40. The tip 48 of an insulating body 49, also embodied as conical, protrudes through this opening 45, and the insulating body 49 surrounds a straight middle electrode 50 which exits at the tip of the insulating body. The insulating body, preferably made of spark plug ceramic, is inserted into the housing 38 and is in heat-conductive contact therewith. This insulating body may be the ceramic body insert having an electrode which is conventional in spark plugs. The middle electrode, because of the eccentric disposition of the insulating body, extends almost up to the wall 51, defining a conical body, of the ignition chamber and there forms a spark gap 52. The wall 51 has an annular bulge 53 at this location. The conical jacket part, that is, the wall 51, of the ignition chamber insert 37 furthermore, in analogous embodiment to FIG. 1, has a heat pipe 54, which may naturally be made up of a plurality of individual pipes.

This embodiment has the advantage that the ceramic of a conventional spark plug can be used to realize the ignition device. The sleeve 46 is also advantageously provided, to protect the lower base portion of the tip 48 of the insulating body from heating up. The conical angle of the sleeve 46 is identical to the conical angle of the tip 48. Between the sleeve 46 and the insulating body tip 48, there is an air gap 47 sealed off from the ignition chamber.

The axial direction of the first channel 42 is not entirely coaxial with the axis of the ignition chamber insert 37, but is instead such that the central mixture stream is directed into the middle of the rear volume portion 55 of the ignition chamber insert 37. Because of the form of the ignition chamber 40, which widens in conical fashion away from the inlet location of the second channels 44, after the initial rapid rotating motion of the tangentially introduced mixture portion this motion is slowed, being braked further by the mixture flowing back from the rear portion 55 of the ignition chamber. In this embodiment, the mixture portion which flows in directly is larger than the mixture portion entering in rotary fashion via the second channels 44. This latter mixture portion is intensively warmed at the conical-jacket-like wall 51, whose temperature is controlled by the heat pipe 54. In particular, a portion of the conical-jacket-like wall still protrudes into the main combustion chamber 3, so that the heat loss of this wall portion to the cooled walls 56 of the main combustion chamber 3 is reduced. The annular bulge 53 causes an intensive circular scavenging of the wall area in the region of the ignition location, as a result of which the wall at this location adopts a relatively high temperature.

This embodiment, in comparison to the advantages discussed in connection with the previous example, has the advantage of a still smaller space requirement for the portion of the ignition chamber which protrudes into the main combusion chamber. Only a very small portion of the entering charge, intended for the first ignition, is warmed intensively and enriched with fuel in the wall area by means of rotation, so that under given conditions the mixture attains the state of optimal flammability in a sufficiently short time.

Figure 4:
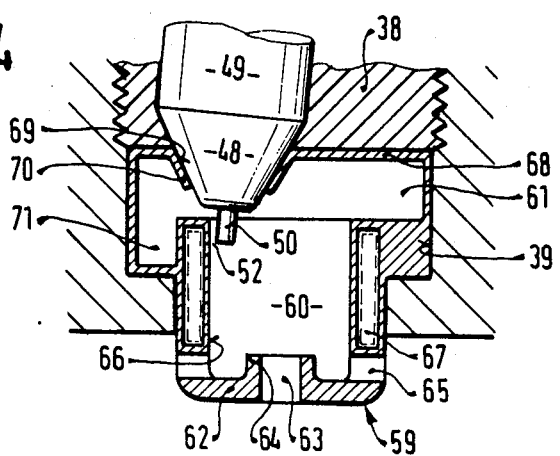
FIG. 4 shows a further cross-sectional view of a variant of the exemplary embodiment of FIG. 3 wherein the ignition chamber is cylindrical and has a portion of enlarged diameter.

The exemplary embodiment of FIG. 4 has, like that of FIG. 3, an eccentrically inserted insulating body 49, which is held in a housing 38 threaded into the stepped bore 39. The housing 38 fixes an ignition chamber insert 59 in the stepped bore 39. The ignition chamber insert 59 is embodied similarly to the ignition chamber insert 7 of FIG. 1 and includes an ignition chamber which comprises a first, cylindrical ignition chamber portion 60 of smaller diameter and an adjacent, rear ignition chamber portion 61, which also has a substantially cylindrical form. The portion of the ignition chamber insert 59 containing the first, cylindrical ignition chamber portion 60 projects with its end face 62 and a first portion of its cylindrical walls into the main combustion chamber 3. This end face, as in the exemplary embodiment of FIG. 1, has in the middle a first channel 63, whose axis deviates only slightly from the axis of symmetry of the rotationally symmetrical ignition chamber insert. In the region of the first channel, the end face 62 is provided, on the inside toward the ignition chamber, with a stub 64 which similarly to that of the embodiment shown in FIG. 1 serves to guide mixture portions which proceed via second channels 65 into the first, cylindrical ignition chamber portion 60. The second channels 65 are disposed in the cylindrical wall 66 defining the first, cylindrical ignition chamber portion 60 in such a way that they extend tangentially to the ignition chamber and substantially radially; they are located on the outermost end of the cylindrical wall, immediately adjacent to the end face 62. As in the exemplary embodiment of FIG. 1, a heat pipe 67, which extends over the entire length of the cylindrical wall 66, is provided in the cylindrical wall 66.

The rear ignition chamber portion 61 is bounded by an end face 68, which has an opening 69 located eccentrically relative to the ignition chamber axis. This opening 69 is surrounded by a sleeve 70 which projects into the rear ignition chamber portion 61 and narrows in conical fashion, serving to receive the tip 48 of the insulating body 49. This insulating body is embodied in the same manner as that of FIG. 3 and has a straight middle electrode 50, which forms a spark gap 52 between itself and the cylindrical wall 66. The spark gap 52 is located at the end of the cylindrical wall 66 opposite the end face 62. This cylindrical wall 66, in the region of the spark gap 52, projects freely into the rear ignition chamber portion 61, which at that location has a recess 71 extending over approximately half the outer circumference of the cylindrical wall 61.

In this exemplary embodiment, a portion of the fresh mixture charge is introduced via the first channel 63, whereupon a mixture stream is established which is directed approximately onto the center point of the volume of the rear ignition portion 61. The second portion of the fresh mixture charge enters via the overflow channels 65 and is set by their guidance into rotating motion, so that a potential vortex is established, just as has been described in connection with the exemplary embodiment of FIG. 1. The mixture is intensively warmed by means of the heat pipe 67 provided in the cylindrical ignition chamber wall, without overheating taking place. This exemplary embodiment offers a higher heat loss output of the cylindrical wall in the region of the ignition spark 52, because the cylindrical wall here protrudes freely into the rear ignition chamber portion 61. Smaller heat losses thus occur at a location where there is a longer dwell time on the part of the entering mixture, which increases the intensity of heating of the mixture. This embodiment, as well, is very compact, having a relatively small diameter of the ignition chamber insert portion projecting into the main combustion chamber. There is also the opportunity of using the ceramic of a conventional spark plug as the ignition device. The ceramic can be guided up to directly adjacent the ignition location, between the electrode and the ignition chamber wall, so that the thermal stressing of the ignition electrode can be kept low, because of the good-quality heat removal by the insulating body which widens in conical fashion. Heating of the insulating body is reduced further in that the sleeve 70 adapted to the conical angle of the tip 58 is provided, covering large areas of the tip and protecting them from heat absorption, so that the ceramic of the insulating body has to remove only the heat arising at the tip in the region of the electrode.

Figure 5:
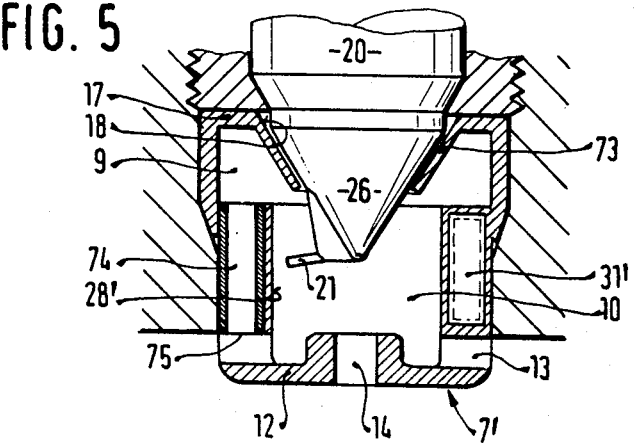
FIG. 5 shows a fourth exemplary embodiment having a cylindrical ignition chamber and an overflow channel which leads, in the wall of the ignition chamber, from the part of the ignition chamber protruding into the combustion chamber to the rear part of the ignition chamber which is remote from the combustion chamber.
Figure 6:
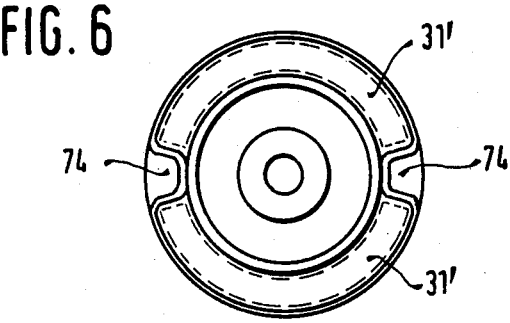
FIG. 6 is a section taken through the exemplary embodiment of FIG. 5.

The exemplary embodiment of FIG. 5 is designed similarly to that of FIG. 1. Here, there is also a sleeve 73 which narrows in conical fashion into the interior of the rear ignition chamber portion 9 on the end face 17 in the region of the opening 18. The sleeve 73 covers the base portion of the tip 26 of the insulating body 26 and protects it from the inflow of heat. Furthermore, one or two further channels 74 are provided in the cylindrical wall 28' which extend parallel to the axis of symmetry of the ignition chamber insert 7' and exit freely into the rear ignition chamber portion 9. On the opposite end, the channels 74 have an exit opening 75 into the main combustion chamber 3. As may be seen in the section of FIG. 6, the heat pipe 31' then comprises, by way of example, two halves which are separated from one another by the two channels 74.

In this exemplary embodiment the fresh charge is introduced directly into the rear ignition chamber portion 9 via the first channels 74 during the compression stroke of the internal combustion engine, and from there this fresh charge flows back toward the first, cylindrical ignition chamber portion 10. At the same time, the other fresh mixture portion is introduced via the second channels 13 on the end of the first, cylindrical ignition chamber portion 10 toward the combustion chamber in such a way that it is set into rotating motion. The axial motion components, directed oppositely, of the two mixture portions cancel each other out in the region of the ignition electrode 21, so that an increased dwell time at this location is the result, particularly for the mixture which has been set into rotating motion. Ignition toward the cylindrical wall 28 occurs as in the embodiments described above, in the boundary layer in which the mixture has been enriched with fuel as a result of the rotation, has a low average flow velocity, and is in addition optimally warmed. By appropriate dimensioning of the cross sections of the channels, the boundary between the rotating mixture and the mixture flooding back out of the rear ignition chamber portion 9 can be adjusted, so that ignition always occurs in the region of a mixture which has been enriched with fuel as a result of rotation and is virtually free of remnant gases from the preceding combustion process, so that resulting conditions are optimal for ignition.

In this form of embodiment, the first channel 14 can also be eliminated.

Figure 7:
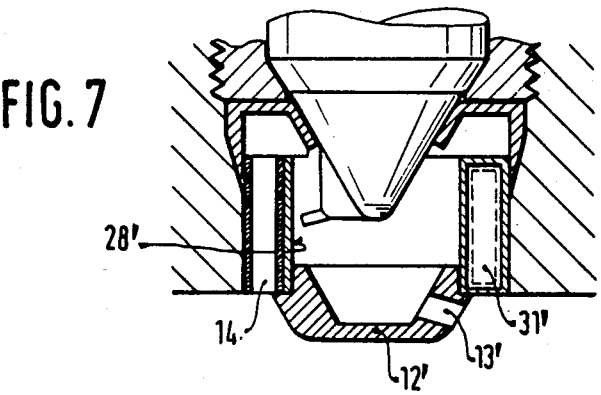
FIG. 7 shows another horizontal cross-sectional view of a fifth exemplary embodiment having a thermally insulated end wall forming the boundary of the ignition chamber with the main combustion chamber of the internal combustion engine, the end wall having overflow channels which extend exclusively tangentially.

The exemplary embodiment of FIG. 7 shows a variant of the embodiment of FIG. 5; here, the central, first channel 14, disposed in the first wall 12 in the exemplary embodiment of FIG. 5, is omitted. The first wall 12' in the exemplary embodiment of FIG. 7 is embodied as an insert, which has an approximately bowl-like form and has only tangentially extending, second channels 13'. The bowl-like first wall 12' is the sole portion of the ignition chamber insert which protrudes into the main combustion chamber. The bowl-like part forming the first wall 12' is inserted into the inside diameter of the cylindrical wall 28', so that the wall thickness between the inner surface of the bowl-like part 12' and the heat pipe 31' in the cylindrical wall 28' is increased. The bowl-like part 12' is accordingly heated to an increased extent, so that the entering fresh mixture here is rapidly warmed immediately upon its entrance via the second channels 74.

Figure 8:
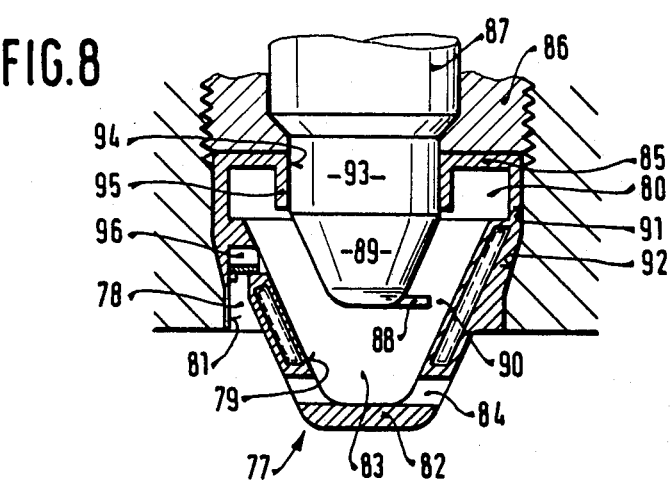
FIG. 8 shows still another horizontal cross-sectional view of a sixth exemplary embodiment having a frustoconical ignition chamber and an overflow channel leading into the rear part of the ignition chamber, the overflow channel containing a check valve.

The exemplary embodiment of FIG. 8 shows a variant of the exemplary embodiment of FIG. 3. Here, as well, the ignition chamber insert takes the form of a truncated cone, whose tip protrudes into the main combustion chamber 3. Deviating from the exemplary embodiment of FIG. 3, instead of the first channel 42 on the end face 41 of the ignition chamber insert, a first channel 78 is provided, which extends within the wall 79, which at least on the inside takes the form of a conical jacket, and discharges directly into the rear ignition chamber portion 80. On the combustion chamber side, the first overflow channel 78 has an opening 81, so that the rear ignition chamber portion, which is located opposite the end face 82 protruding into the main combustion chamber, communicates via the first overflow channel with the main combustion chamber. Immediately adjacent to the end face 82, the ignition chamber insert has second channels 84 which extend tangentially to the frustoconical ignition chamber 83 enclosed in the ignition chamber insert 77. The end face 85 located opposite to the end face 82 is adjacent to a housing 86, which serves to receive an insulating body 87, which, like the insulating body 20 of FIG. 1, surrounds an electrode 88, which protrudes out of the conical tip 89 toward the conical wall 79 and there forms a spark gap 90. The same is true for the position of the spark gap relative to the axial extension of the rotationally symmetrical ignition chamber insert, that is, the ignition chamber 83, as has already been described in connection with the previous exemplary embodiments. The ignition chamber insert 77 is held here as well by the screw-inserted housing 86 in the reception bore 91 of the combustion chamber wall 1, with a tight seal of the combustion chamber being simultaneously provided therein. This may advantageously be accomplished with a conical sealing face 92 on the outer circumference of the ignition chamber insert 77 in the region of the bore 91.

The insulating body, deviating from the exemplary embodiment of FIG. 3, is inserted coaxially with the ignition chamber insert 77 and has a cylindrical portion 93 directly attached at the back to the conical tip 89, the cylindrical portion 93 passing through the central opening 94 in the end face 85 and being surrounded by a cylindrical sleeve 95 extending inward from the opening 94. This sleeve 95 serves in turn to shield the insulating body from the heat building up in the ignition chamber 83. The form of the insulating body, which widens in diameter from the ignition electrode 88 outward, favors the removal of heat from the free surface of the insulating body which protrudes into the ignition chamber 83.

Analogously to the exemplary embodiment of FIG. 5, a portion of the fresh charge is introduced during the compression stroke of the engine via the first channel 78 directly into the rear ignition chamber portion 80, while at the same time the other portion of the fresh charge proceeds via the second channels 84 into the ignition chamber 83. This fresh charge portion in the manner which has already been described, is set into rotating motion which, because of the enlarged diameter, gradually slows down and whose axial component is also slowed by means of the mixture flowing back out of the rear ignition chamber portion 80.

A distinguishing feature of the first channel 78 is a check valve 96, in the form of a flutter valve, which opens into the ignition chamber in the flow direction and closes in the opposite direction. Flutter valves are generally known and can be used here in a structurally adapted form. This results in the advantage that after the ignition of the warmed mixture, streams of flame exit only via the second channels 84 into the combustion chamber, so that here the entire charge of the ignition chamber can be utilized in optimal fashion for igniting the mixture located in the main combustion chamber 3. The ignition duration can be prolonged in this manner, in proportion to the filling duration of the ignition chamber 83. This form of embodiment, having the centrally inserted insulating body 87, offers the advantage that the vortex can be established, undisturbed, from the mixture entering via the second channels 84, because the volume of the ignition chamber as a whole has a rotationally symmetrical form. In an advantageous manner, the conical angle of the conical tip 89 is complemental to the conical angle of the conical wall 79.

The principle applied in the exemplary embodiments described above makes it possible to make do with very small ignition chamber inserts, and in particular those having a short axial extension. As a result of slowing the axial motion component of the mixture as it enters the ignition chamber in rotating fashion, the heat exchange surface can be kept small, which favors this structural form.

The foregoing relates to preferred exemplary embodiments of the invention, it being understood that other embodiments and variants thereof are possible within the spirit and scope of the invention, the latter being defined by the appended claims.

What is claimed and desried to be secured by Letters Patent of the United States is:

1. An apparatus for igniting a combustible mixture in a main combustion chamber of an internal combustion engine, wherein the apparatus comprises:

a substantially rotationally symmetrical ignition chamber wall formed by a circumferential wall having a first diameter section which is of lesser diameter than a second diameter section with the length of said chamber greater than the diameter, a front wall integral with said first diameter section and extending into said combustion chamber of said engine, a first, axially aligned, overflow conduit which penetrates said front wall, and a plurality of second overflow conduits which substantially discharge into said ignition chamber at a tangent with said first diameter section of said chamber along a diametrical plane, an ignition device having an insulator, a first electrode supported by said insulator, a second electrode connected to ground and a spark gap located between said first and second electrodes, characterized in that the second overflow conduits, at the outermost end toward the combustion chamber of the ignition chamber, discharge at a tangent to the circumferential wall of said first diameter section in a plane radial to the longitudinal axis of the ignition chamber, said insulator protrudes into an end of the ignition chamber axially through said second diameter section and facing said front wall, one end of said electrode supported by said insulator, which electrode defines a spark gap path and terminates in a vicinity near the circumferential wall in a reference plane located transversely to the longitudinal axis of the ignition chamber, which plane divides the volume of the ignition chamber into a first partial volume, adjacent to the front wall, and a second partial volume, into which the insulator plunges, the second partial volume being at least equal to said first partial volume.

2. An apparatus for igniting a combustible mixture in a main combustion chamber of an internal combustion engine as claimed in claim 1 wherein said circumferential wall is cylindrical.

3. An apparatus as defined by claim 1, wherein the circumferential wall of the ignition chamber protrudes freely, in a region of the first electrode igniting toward the circumferential wall of the ignition chamber into the second diameter section of the ignition chamber and also contains a heat pipe in this region.

4. An apparatus as defined by claim 1, wherein the first overflow channel which discharges into the second diameter section located opposite the first wall has a check valve opening in a direction of the ignition chamber.

5. An apparatus defined by claim 4 wherein the first overflow channel is disposed in the front wall of the ignition chamber which is disposed in an ignition chamber insert which is tightly insertable into a wall of the main combustion chamber of the internal combustion engine.

6. An apparatus as defined by claim 1 wherein said first diameter section of said ignition chamber includes an annular heat pipe disposed in said circumferential wall to form a jacket surface located adjacent cooled portions of said internal combustion engine.

7. An apparatus as defined by claim 6, wherein portions of said ignition chamber walls forming said jacket surface of said ignition chamber and located adjacent to cooled portions of said internal combustion engine include at least one hollow chamber disposed at least in a region of the second electrode and is filled with a vaporizable medium serving a purpose of heat transport.

8. An apparatus as defined by claim 7, wherein the at least one hollow chamber is embodied as a heat pipe.

9. An apparatus as defined by claim 8, wherein an insulating gap is disposed between the circumferential wall of the ignition chamber and adjacent cooled parts of the internal combustion engine in a partial region of an axial extension of the heat pipe disposed in the circumferential wall of the ignition chamber.

10. An apparatus as defined by claim 6, wherein the ignition chamber is disposed in an ignition chamber insert which is tightly insertable from outside into an appropriately shaped opening in a wall of the main combustion chamber.

11. An apparatus as defined by claim 10, werein the ignition device has said first electrode embedded in a heat-removing insulating body which protrudes from an end face located opposite said front wall into said ignition chamber and surrounds said first electrode up to shortly before the spark gap location.

12. An apparatus as defined by claim 11, wherein the insulating body is held in a threadedly insertable housing.

13. An apparatus as defined by claim 12, wherein the ignition chamber insert is held in the opening in the combustion chamber wall by means of the housing which is threadedly insertable from outside into the wall of the main combustion chamber.

14. An apparatus as defined by claim 11, wherein a portion of the insulting body substantially protruding into said ignition chamber is embodied as conical.

15. An apparatus as defined by claim 14, wherein the end face of the ignition chamber located opposite the front wall has an opening for receiving the insulating body and there forms a sleeve adapted to the conical form of the insulating body and protruding into an interior of the ignition chamber.

16. An apparatus as defined by claim 14, wherein the first electrode is embodied as a middle electrode passing through the axis of the insulating body and the insulating body is disposed eccentrically relative to the axis of the ignition chamber.

17. An apparatus as defined by claim 14, wherein the ignition chamber is formed substantially conical and in particular frustoconical.

18. An apparatus as defined by claim 17, wherein the conical form of the ignition chamber has an angle which corresponds to that of a portion of the insulating body protruding into the ignition chamber.

19. An apparatus as defined by claim 18, wherein the circumferential wall of the ignition chamber has an annular bulge-like thickening in the region of the spark gap.

* * * * *